April 22, 1941.  H. A. LEWIS ET AL  2,238,939
BLASTING ASSEMBLY
Filed Jan. 21, 1939  3 Sheets-Sheet 1
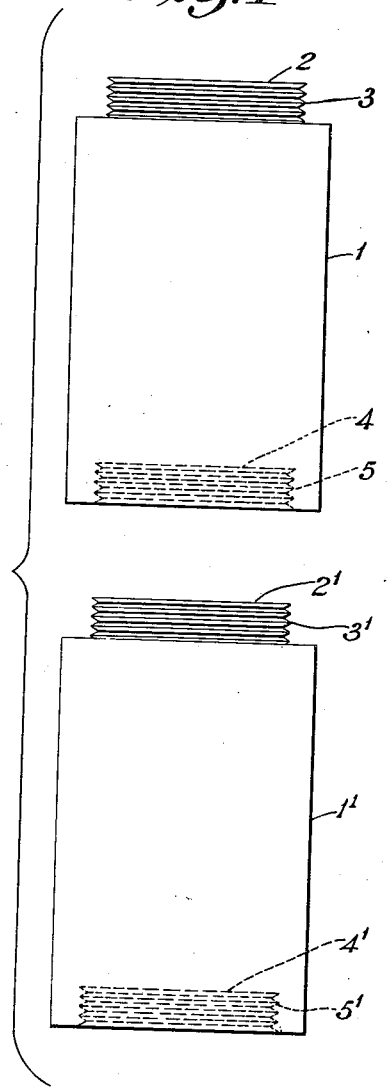
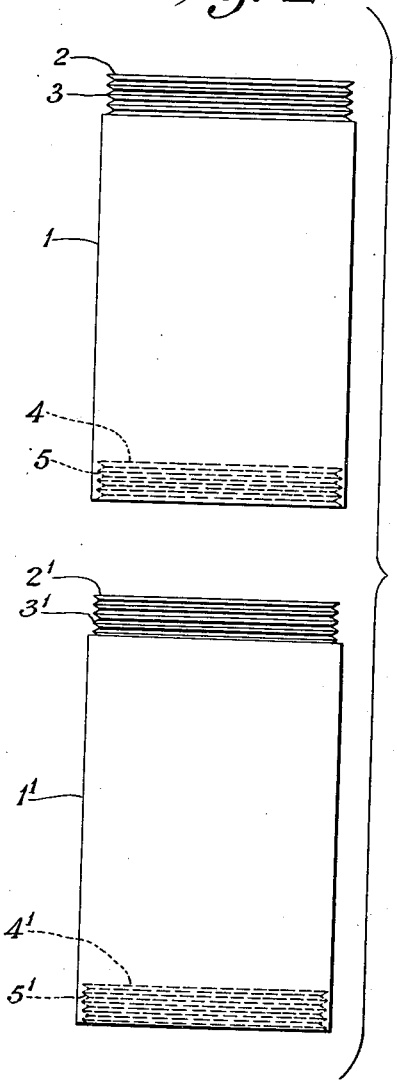
Fred R. Wilson
Harold A. Lewis  INVENTORS
BY
ATTORNEY

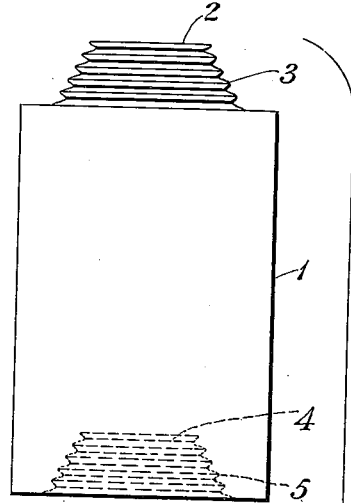
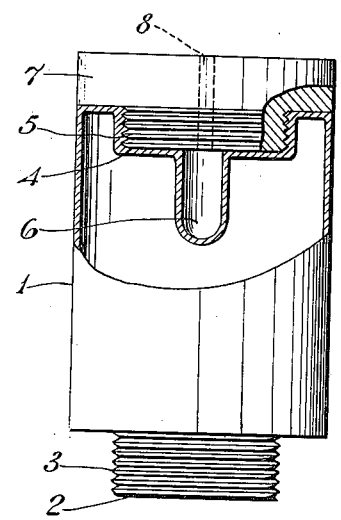
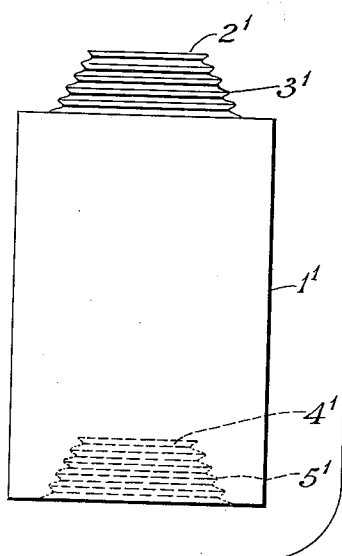
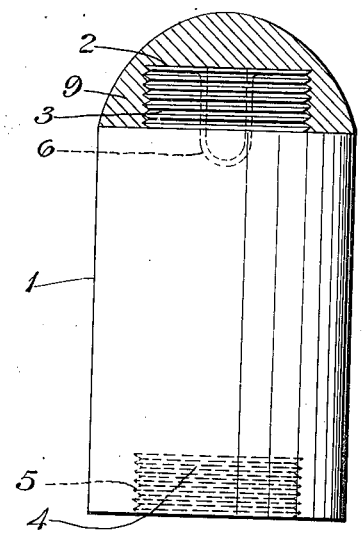

April 22, 1941.  H. A. LEWIS ET AL  2,238,939
BLASTING ASSEMBLY
Filed Jan. 21, 1939   3 Sheets-Sheet 3
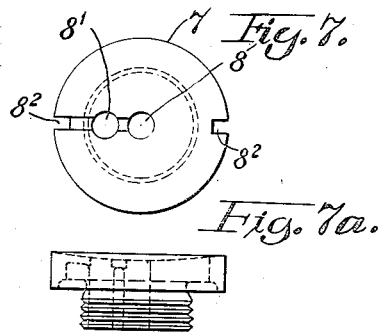
Fig. 7.
Fig. 7a.
Fig. 6
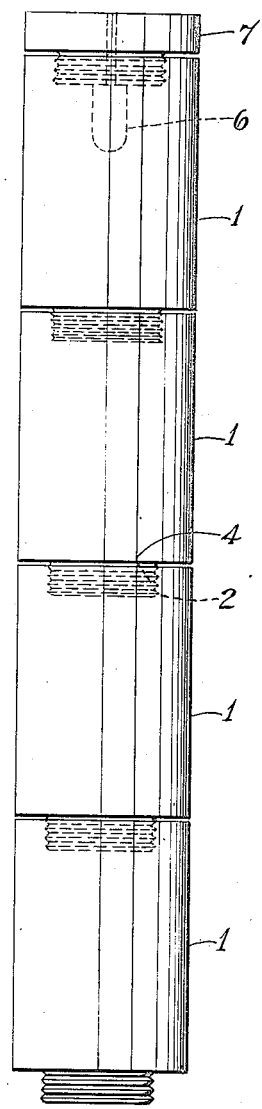
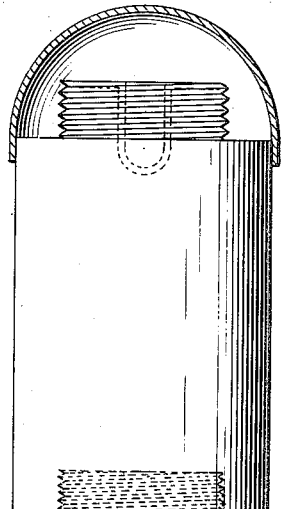
Fig. 8.
Fred R. Wilson
Harold A. Lewis   INVENTORS
BY Thos. A. Wilson
ATTORNEY

UNITED STATES PATENT OFFICE 2,238,939

BLASTING ASSEMBLY

Harold Arthur Lewis, Wilmington, Del., and Fred Raymond Wilson, Swarthmore, Pa., assignors to E. I. du Pont de Nemours & Company, Wilmington, Del., a corporation of Delaware Application January 21, 1939, Serial No. 252,116

7 Claims. (Cl. 102—5)

The present invention relates to an improved blasting assembly especially adapted for use in seismic operations.

In seismic blasting operations the conditions encountered present problems which cannot be solved by the use of conventional explosive cartridges or assemblies.

In contrast to quarry drilling, the seismic drill holes are not characterized by well-defined side walls of rock. Instead, the seismic drilling often is carried out in mucky strata so that the resulting hole is not very satisfactorily defined. Even in cased holes, quicksand often comes up into the casing. Furthermore, even though the holes may not be mucky at the start of the blasting operations, the seismic practice of shooting repeatedly in the same hole invariably results in the destruction of any rigid contour of the walls of the drill hole and produces a mucky condition therein. In such mucky holes the loading step becomes not one of simply lowering cartridges into the hole, but a process of forcing or thrusting the cartridges down into the muck.

These conditions give rise to several serious difficulties. In the first place, only a very limited amount of force can be applied safely to gelatin dynamites or similar high velocity nitroglycerin explosives which are otherwise well fitted to seismic blasting. It is undesirably dangerous, for example, for three men to climb up on a pole, the base of which is resting against gelatin dynamite in a mucky drill hole, in an attempt to force said dynamite down into the muck. Yet, such are the expedients which must be employed in seismic blasting with the cartridges of the assemblies of the art.

Furthermore, blasting compositions relatively insensitive to shock have been found to be unsatisfactory to date in seismic operations for several reasons. In the first place, some of these compositions are so insensitive that they will not sustain propagation except in very large diameters in the conventional lowering assemblies. The larger the diameter, of course, the more difficult it is to force the cartridge into a mucky drill hole. Secondly, such high pressures are encountered in certain drill holes that these compositions are rendered too insensitive to sustain propagation. Even if these charges are enclosed in the rigid containers of the conventional lowering assemblies, loading in these mucky holes is hopeless, for such assemblies are adapted to lowering freely in a well-defined drill hole and are not suitable for forcing into a poorly defined hole. In addition, mud accumulates between the units of these conventional assemblies, damping out propagation of the detonation wave.

Accordingly, no existing blasting method or assembly is entirely satisfactory for seismic blasting operations, especially when compositions relatively insensitive to shock are employed.

An object of the present invention is a blasting assembly especially adapted to seismic blasting operations. A further object is such an assembly in the form of a column characterized by sufficient rigidity to permit forcing the same into a mucky drill hole without appreciable deviation from the rectilinear direction of any unit of said column. Another object is such an assembly which can be forced roughly into a drill hole with safety. A further object is a blasting assembly unit which permits the use of a blasting composition susceptible to the action of water or high pressures but which maintains said composition at its original density and degree of sensitiveness to detonation.

The foregoing objects are accomplished according to the present invention by enclosing the blasting charges in a series of unit charged water-tight rigid containers adapted to be joined together rigidly end to end to form a rigid column without any intervening gaps between said units. These individual containers, preferably of metal, are preferably permanently closed that is, closed in water-tight fashion and so designed that any two adjacent containers can be readily adjusted so that a co-operating junction is formed between them. When so joined they will lie in a common rigid axis, permitting the detonation to propagate continuously along said axis from one to the other without encountering any gap to be bridged between said units.

Various methods may be employed for joining said adjacent containers to form a firm, straight column. Our preferred method of junction, for instance, consists in providing each container at one end with a projection having an external screw thread, and at the other a recess with an internal screw thread, the external and internal threads being so formed as to give a firm union when the unit containers are screwed together, so that a rigid column results.

The invention may be more readily understood by reference to the accompanying drawings in which similar numerals are employed to designate corresponding parts throughout the several views.

It is understood that this is done purely for the purpose of illustrating the preferred form of the invention and is not to be construed as a limitation upon the scope of said invention.

Figures 1, 2, and 3 are elevational views of pairs of metal containers of several types, showing their complementary connecting portions about to be joined together. Figures 4 and 5 are views in cross-section of primer units. Figure 6 is a view of a rigid column assembled with primer intact. Figs. 7 and 7a are respectively a plan and an elevational view of the detonator shield. Fig. 8 is an elevational view partly in section of a container with slip cover in place.

In Figure 1 the explosive charges are enclosed in the cylindrical water-tight permanently closed metal containers 1 and 1'. These containers are provided with respective protruding ends 2 and 2' which extend above the end of each cylinder and are furnished with screw threads 3 and 3'. At the respective opposite ends of the cylinders 1 and 1' are the recessed portions 4 and 4', which in complementary fashion are provided with internal threads 5 and 5'. Container 1, therefore, can be readily joined to container 1' in rigid fashion by screwing protruding end 2' of container 1' into the recessed portion 4 of container 1. Each of said containers is charged with a detonating composition and is substantially filled therewith. The container is permanently sealed in water-tight fashion about said explosive.

Figure 2 depicts containers in which the complementary projecting and recessed portions are somewhat modified from those shown in Figure 1. Thus, the projections 2 and 2' are in the form of truncated cones and the recesses 4 and 4' are also conical and truncated in nature, being adapted to receive said projections. The threads 3 and 3' are disposed on said conical surfaces and the complementary internal threads 5 and 5' are disposed in the conical walls of the recesses 5 and 5'.

Figure 3 shows still another modification representing the limiting case of the projection and recess in which the projections 2 and 2' are only slightly reduced in cross-section from that of the cylindrical container itself, while the recesses 4 and 4' have a similar cross-section and the walls of the recesses bearing the threads 5 and 5' have approximately the same thickness as the walls of the container.

The type of primer particularly suitable for the assembly is shown in detail in Figure 4. The primer composition is enclosed in the metal container 1, having on one end the projection 2 with threads 3, and on the other end the recess 4 with threads 5. Approximately in the center of said recess is an elongated well 6, adapted to receive a detonator such as a commercial blasting cap, for example. Disposed over said recess and well, in a position protecting the same, is the detonator shield 7. This shield insures that no external object shall come in rough contact with the detonator after the latter has been placed in the well 6. The shield 7 desirably may be provided with groove 8, adapted to permit passage of the detonator wires. In a slightly modified form the shield may be provided with a plurality of grooves 8 and 8' and/or co-operating slots 8² along the circumference, as disclosed in detail in Figure 7. When the shield is of this form, it is convenient to use it as an anchoring means for any suitable lowering strings or the like. Preferably, the leg wires of the initiator itself are threaded back and forth through the multiplicity of grooves and/or slots indicated in Figure 7 in such a way that no pull is exerted on the detonator itself. These leg wires may then be grasped to lower the assembly. The shield may be composed of any strong, durable material which is not exceedingly brittle, such as wood, hardened plastic compositions, metal, or the like. When employed on the recess end of the assembly as in Figure 4, the shield lends appreciably to the safety of the assembly in that a pole or similar forcing means may be rested on the shield and force applied thereto to impel the assembly into the mucky drill hole. The shield in this way serves to prevent such a pole from any rough contact with the detonator which would be disposed in the detonator well. Accordingly, it is sufficient if the material of which the shield is composed has sufficient strength and rigidity to protect from shock the detonator disposed thereunder, especially during such a poling operation.

Figure 5 discloses a somewhat different modification of the primer structure wherein the initiator well 6 is disposed in that end of the container bearing the projection 2. The detonator shield in this instance takes the form of the slip cover 9, as contrasted with the block 7 of Figure 4. The shield, when placed on this end of the assembly, will preferably take the conical or pointed shape indicated in order that it may serve not only as a shield for the detonator disposed in the detonator well, but may, in addition, serve to point the entire assembly so that it may be forced more readily into the mucky drill hole. Although the preferred form is the slip cover as shown, the shield may be fastened on in any convenient manner such as by means of threads, friction joints, or the like. The shield should preferably be composed of material of sufficient rigidity to retain its pointed shape while the assembly is being forced down into the muck, at the same time being sufficiently strong to prevent communication of pressure or shock upon the detonator disposed beneath its point. This type of shield also may be conveniently equipped with slots, grooves, or the like to permit passage of the detonator leg wires. As indicated in the foregoing, wood, metal, or tough plastic compositions are preferred for this purpose.

Any suitable number of the charged unit water-tight permanently closed metal containers may be joined together with a primer unit to form a rigid blasting column assembly as shown in Figure 6. Each metal container 1, containing its charge of blasting composition is joined in close contact with its neighbor substantially throughout its cylindrical cross-section by means of the threaded projections and recesses 2 and 4. Thus, the cylindrical column of explosive is substantially continuous throughout the length of said column of joined containers, with the interposition of the inappreciable layers of metal bounding the projection and recess portions of the containers.

The primer also forms a continuation of the column, and is adapted to receive the initiator in the well 6, protecting the same by means of the detonator shield in the form of the block 7. The result is a rigid column of blasting composition, said column having sufficient rigidity that it may be forced into a mucky drill hole without danger of explosion. The permanently closed rigid containers bounding said column not only serve to keep out moisture from highly hygroscopic blasting compositions, but, in addition, serve to protect the composition from pressures encountered in the drill hole; that is, from pressures which might otherwise so alter the density of certain insensitive blasting compositions as to prevent their being sufficiently sensitive to propagate in the relatively small diameters which may be employed in said column. The foregoing conditions render possible the use of relatively insensitive blasting compositions in unit containers of relatively small size. As a matter of convenience and preference, the unit containers employed are desirably approximately from 4 to 12 inches in length and from 1½ to 3 inches in diameter, although we do not intend to be limited by these dimensions. Likewise, each of said unit containers desirably may be charged with from ½ to 4 pounds of blasting composition, although we do not intend to be limited to this amount.

Any blasting composition may be employed in the unit containers of the column assembly of our invention, but we prefer a composition relatively insensitive to shock. It is only necessary that the charge in the primer unit be sensitive to the type of initiator to be used. Preferably, the primer charge should be sensitive to a standard commercial blasting cap.

Although the advantages of our invention accrue from the rigidity and continuity of the assembly column, no matter what blasting charge is employed, it should be mentioned that our invention renders possible the extended use of certain rather safe blasting compositions which display a low degree of sensitiveness to shock. We may cite in this classification compositions comprising largely ammonium nitrate and a sensitizer so characterized and present in such an amount that the resulting composition is relatively insensitive to shock. Compositions of this type, whose use may be greatly extended by means of my assembly, are those so insensitive as to pass a full-stick space sensitiveness test of less than 7 inches when shot unconfined in cartridges 1¼ inch in cross-section.

Other rather safe blasting compositions rendered useful by my assembly are those comprising trinitrotoluene, ammonium picrate, and certain other picrates, mixtures of trinitrotoluene with ammonium nitrate, and compositions displaying a like degree of sensitiveness.

The following examples will serve to illustrate a preferred embodiment of the explosive column assembly according to our invention. It is to be understood, however, that the scope of the invention is not limited thereby with respect either to the structure or to the charges employed.

Example 1

Five cylindrical metal containers were charged with a blasting composition consisting of 92.5% ammonium nitrate, 4.0% dinitrotoluene, and 3.5% of paraffin. The body of the container was constructed of that material known to the metal arts as "90 lb. base metal," classified as "manufacturer's special coated terneplate." This material was approximately .010 inch in thickness. The cylindrical body of the container was 2⅛ inches in diameter and 6½ inches in length. At one end was a projection of lesser diameter extending approximately ½ inch above the body of the container. At the other end was a recess approximately ½ inch deep of diameter suitable to receive a projection of the type described. On the projection was an external thread displaying about eight threads to the inch. A similar internal thread was disposed in the recess.

Each of said containers was charged with approximately one pound of said blasting composition packed to a density of approximately 1.1.

These five charged containers were screwed together to form a continuous rigid column. At one end of said column was attached a primer unit constructed as follows: A cylindrical metal container approximately 2⅛ inches in diameter and 6½ inches in length was charged with approximately one pound of a composition comprising 80% ammonium nitrate and 20% trinitrotoluene packed to a density of approximately 1.1, the primer container was equipped with threaded projection and recess, as described in the foregoing, and was constructed of similar metal. However, in the end having the recess, an initiator well consisting of a drawn copper tube with flange at the open end was disposed in the base of the recess with its closed well extending downward into the primer unit. This well was approximately 3 inches in depth.

A wooden block was disposed in the recess immediately over the initiator well. This block was grooved to permit passage of detonator leg wires. Due to the firmness of the threaded connections, the five blasting units and the primer were readily joined together to form a rigid blasting assembly column wherein the explosive columns of the separate units were held end to end so close together as to permit continuous propagation of the detonation wave from the primer unit throughout the length of the column transversing readily the inappreciable thicknesses of metal constituting the end closures of the various units.

Example 2

An assembly similar to that described in Example 1, was charged throughout with an explosive comprising 80% ammonium nitrate and 20% trinitrotoluene. Thus, as distinguished from Example 1, the entire assembly here including the primer unit was charged with an explosive relatively insensitive to shock but sensitive to a commercial blasting cap. The continuous rigid column resulting could be inserted into a mucky hole without any apprehension of failure of propagation of the relatively insensitive explosive.

The blasting assemblies according to the present invention offer many advantages to the art.

In the first place, a remarkable advantage of the present assembly is that it renders possible the use of the relatively insensitive charges in diameters smaller than heretofore possible. Thus, in assuring the rectilinear direction of the column and the absolute continuity of the same, by screwing the units into intimate contact with no intervening space, the cylindrical blasting charge itself is made substantially continuous from one container to the next, so that propagation of the explosion is enhanced. Furthermore, the rather insensitive compositions are so protected by the metal container that they resist compression by pressures encountered in the drill hole. Heretofore, the presence of said pressures has been known to increase the density of the charge to such an extent as to render it insensitive to initiation and propagation.

A further advantage lies in the fact that, by means of the unit containers of this invention, a rigid column of blasting composition may be formed of any suitable length at the place of operation. This column will have a rigidity permitting it to be forced into any mucky drill hole without appreciable change in direction or deviation from the axis at any point.

In view of these factors, it will be appreciated how important the present invention is to the art of seismic prospecting where charges of from 1 to 50 pounds or more may be shot in long columns. The assembly of the present invention is likewise highly desirable for submarine blasting operations. It will be seen that by the use of the unit containers of the present invention any desired weight of charge may be assembled in a single continuous, rigid column at the place of operation by joining together a sufficient number of the unit containers. It is to be understood that, although the foregoing are the preferred uses, the units and assembly of our invention may be applied with advantage to many other types of blasting operations.

The invention has been described fully in the foregoing, but it will be understood that many variations in the form of the container, connectors, and blasting charges may be used without departing from the spirit or scope of the invention. For example, as an alternative connecting means, projections or lugs may be prepared at one end of the container with correspondingly located slots at the other end. Two or more such containers can then be joined by fitting together the lugs of one container and the slots on the abutting container. We intend to be limited, therefore, only by the following patent claims.

We claim:

1. A blasting column assembly comprising a plurality of substantially cylindrical rigid water-tight metal containers joined together end to end in a continuous rigid column, each of said containers being charged with a blasting composition susceptible to the action of water and relatively insensitive to shock characterized by a sensitiveness test of less than 7 inches, each of said containers being provided with connecting means including a projection at one end with external screw threads and a recess at the other end with internal screw threads, a primer unit joined to said column comprising a water-tight metal container having a recess at one end and charged with a cap-sensitive explosive relatively insensitive to shock, an initiator receptacle adapted to receive a commercial detonator disposed in the recess end of said primer container and a shield including a block disposed over said initiator receptacle at the end of said primer, said block being grooved to permit the passage of leg wires from detonators.

2. A blasting column assembly comprising a plurality of substantially cylindrical rigid water-tight metal containers joined together end to end in a continuous rigid column, each of said containers being charged with a blasting composition susceptible to the action of water and relatively insensitive to shock characterized by a sensitiveness test of less than 7 inches, each of said containers being provided with connecting means including a projection at one end with external screw threads and a recess at the other end with internal screw threads, a primer unit joined to said column comprising a water-tight metal container having a projection at one end and charged with a cap-sensitive explosive relatively insensitive to shock, an initiator receptacle adapted to receive a commercial detonator disposed in the projection end of said primer container and a shield including a cover disposed over said initiator receptacle serving as a directional guide for said primer and blasting column assembly.

3. A blasting column assembly comprising a plurality of substantially cylindrical rigid water-tight containers charged with a blasting composition susceptible to the action of water and relatively insensitive to shock, characterized by a sensitiveness test of less than 7 inches, said containers being provided with connecting means on each end, the several connecting means cooperating to join said charged containers in a rigid column, a primer unit joined to said column comprising a rigid water-tight container charged with a priming composition relatively insensitive to shock, an initiator receptacle disposed in one end of said primer container, and a shield disposed over said initiator receptacle.

4. A blasting unit for a blasting column assembly comprising a substantially cylindrical water-tight metal container charged with a blasting composition of the type described susceptible to the action of water and relatively insensitive to shock characterized by a sensitiveness test of less than 7 inches, connecting means disposed on each end of said container including a projection at one end with an external screw thread around the circumference and a recess at the other end with an internal screw thread extending around the circumference of the side wall within said recess, whereby a plurality of said units may be connected together in a rigid column along with a primer.

5. A blasting primer unit adapted to be connected in a blasting column assembly, comprising a water-tight metal container charged with a cap sensitive explosive relatively insensitive to shock, an initiator receptacle adapted to receive a commercial detonator disposed in an end of said container, a shield disposed over said initiator receptacle, and connecting means on an end of said primer container including screw threads disposed around the circumference thereof whereby said primer unit may be connected to a rigid blasting column assembly.

6. A blasting unit for a blasting column assembly comprising a substantially cylindrical water-tight metal container charged with a blasting composition of the ammonium nitrate type as described susceptible to the action of water and relatively insensitive to shock, connecting means disposed on each end of said container including a projection at one end with an external screw thread around the circumference and a recess at the other end with an internal screw thread extending around the circumference of the side wall within said recess, whereby a plurality of said units may be connected together in a rigid column along with a primer.

7. A blasting column assembly comprising a plurality of permanently closed substantially cylindrical rigid water-tight containers charged with a blasting composition susceptible to the action of water and relatively insensitive to shock, said containers being provided with connecting means on each end, the several connecting means cooperating to join said charged containers in a rigid column, a primer unit joined to said column comprising a water-tight container charged with a priming composition relatively insensitive to shock, an initiator receptacle disposed in one end of said primer container, and a shield disposed over said initiator receptacle.

HAROLD ARTHUR LEWIS.
FRED RAYMOND WILSON.